United States Patent Office 2,945,909
Patented July 19, 1960

2,945,909

ISOMERIZATION PROCESS AND CATALYST THEREFOR

Harrison M. Stine, Lyndhurst, and James L. Callahan, Bedford, Ohio, assignors to The Standard Oil Company, Cleveland, Ohio, a corporation of Ohio No Drawing. Filed Dec. 30, 1955, Ser. No. 556,450

2 Claims. (Cl. 260—683.65)

This invention relates to an isomerization process and to an isomerization catalyst having particular surface area characteristics. More particularly, it relates to a catalyst comprising a silica-alumina component having a surface area of about 100 to 250 square meters per gram and containing from 1 to 6% by weight of chromium in the form of chromia ($Cr_2O_3$), and to a process for isomerizing light petroleum hydrocarbons with said catalyst to obtain high yields of products having high anti-knock properties.

Both the anti-knock, or octane, rating and the volume of gasoline consumed have steadily increased since the end of World War II. All indications point to a continuance of these trends. Volume and quality requirements have to be met in part by improved processes, such as catalytic reforming of those petroleum distillates whose volatility makes them suitable for use as gasoline.

Isomerization, as applied to straight chain hydrocarbons, is a reforming process during which methyl and, to a lesser extent, ethyl groups are shifted from the straight chain to side chain position. Such isomers have higher anti-knock characteristics than the corresponding straight chain compounds.

The hydrocarbons to be treated in accordance with the invention comprise $C_5$, $C_6$ and $C_7$ normal alkanes and petroleum distillates comprising the same and a boiling point of about 50 to 250° F. Light naphtha, a preferred feed in the present invention, comprises those hydrocarbons boiling between about 50 to 250° F. and having primarily about 5 to 7 carbon atoms per molecule. Light naphtha, whose components include normal paraffins, iso paraffins, cyclo paraffins, and aromatics, generally has an F-1 clear octane rating in the range of 60 to 70. The normal paraffins content of light naphtha is on the order of 10 to 50% by volume and is largely responsible for its low octane rating. A typical inspection of light naphtha is given later. The isomerization of these normal paraffins is a desirable method for upgrading the octane rating of this stock.

Because isomerization reaction rates are low at temperatures below which thermal decomposition occurs, a catalyst is required if the process is to be economical. It is well known that isomerization is accompanied by side reactions which produce lower molecular weight products, including a substantial proportion of normally gaseous products and carbon, both of which are unsuitable as motor fuel blending components. The suppression of these side or cracking reactions is highly desirable in order to maximize yields of motor fuel distillates. The cracking of heavy naphtha is not quite as serious as the cracking of light naphtha. For example, the conversion of normal decane to pentane and pentene is not necessarily a loss because both reaction products can be used as motor fuel. However, the cracking of pentane or any other component of light naphtha would result in one or more products having less than 5 carbon atoms per molecule, and therefore is a loss of motor fuel. There is a great need for an isomerization catalyst which will simultaneously suppress side reactions and particularly those side reactions involving light naphtha.

It has now been discovered that a catalyst comprising a silica-alumina base component having a particular surface area and containing chromium oxide, simultaneously promotes isomerization of normal alkanes and suppresses undesirable side reactions. Broadly, the invention relates to a catalyst containing a silica-alumina base component having a surface area of 110 to 235 square meters per gram and containing 1 to 6% by weight of chromium in the form of chromia, based on said base component, and to a process for isomerizing petroleum naphtha with said catalyst at temperatures in the range of 700 to 1050° F. and at pressures of 50 to 750 pounds per square inch.

The novelty of the invention resides in the unexpected discovery that conversion to isomers reaches a maximum when the chromium content and surface area are maintained within the narrow limits set forth above. A surprising fact in connection with this catalyst is the lack of a detrimental amount of cracking in the presence of the silica-alumina base component which is well known as a promoter of cracking.

The silica-alumina base component is a well known composition and derived from naturally-occurring or synthetically-produced materials. It will contain on a dry basis from 50 to 95% by weight silica, preferably around 80 to 90%. Naturally-occurring materials include various aluminum silicates whose activity may be increased by acid treatment. Synthetic silica-alumina cracking catalysts are more common because their compositions can be controlled more accurately. The production of synthetic cracking catalysts may be performed (1) by impregnating silica with alumina salts; (2) by direct combination of precipitated (gelated) hydrated alumina and silica; or (3) by joint precipitation (or gelation) of alumina and silica from an aqueous solution of alumina and silica salts. The oxide mixtures are washed, dried, and shaped. For example, the dried mixture may be crushed to a powder or to irregularly sized granules. The granules may be reshaped into pellets or beads of uniform size and shape. The final particles are then treated thermally at temperatures of about 1000° F. Silica-alumina cracking components prepared in this manner have surface areas of about 250 to 400 square meters or more per gram.

Preferably, the surface area of the silica-alumina cracking component should be adjusted before impregnation with chromia ($Cr_2O_3$). This may be accomplished by steaming the component at temperatures of from 900 to 1400° F. at steam pressures from atmospheric pressure to 100 pounds per square inch or higher for a sufficient time, usually about 50 to 100 hours, although longer or shorter periods may be used, to obtain the desired surface area. Another method is to heat the component at temperatures from 1600 to 1800° F. without the use of steam and for a sufficient time to obtain the desired reduction in surface area.

The term "surface area," as used herein, is that determined by the adsorption of nitrogen according to the method of Brunnauer, Emmett, and Teller, found in the Journal of the American Chemical Society, vol. 60, page 309 et sequi (1938).

The reduced area component may be impregnated with chromia in any suitable manner. The preferred method is to admix said component with an aqueous solution of chromic anhydride of suitable concentration and in the desired amount. The mixture is then dried at about 150° F. for 24 hours and air is blown at about 900° F. for an additional 24 hours. Other salts, such as chromium nitrate and chromium acetate, may be used for impregnation. The average valence of chromium is not critical. However, after use in the isomerization process, its valence will probably average about 3.

After a period of service, the catalyst may lose some of its activity as a result of carbon deposition. Regeneration may be accomplished readily by passing air or an oxygen-containing gas thereover in order to burn the deposits from the catalyst. Regeneration temperatures may not exceed about 1100° F. without impairing the catalyst activity.

In carrying out the isomerization process in accordance with this invention, temperatures ranging from 700 to 1050° F. and preferably from 850 to 950° F. may be used. The process also may be conducted at pressures from 0 to 750 lbs. per square inch gauge. Hourly space velocities, meaning the liquid volume of hydrocarbon feed per hour per volume of catalyst, may be in the range of ½ to 5, preferably in the range of 1 to 3. The reaction may be carried out in the presence of hydrogen in amounts from 0 to 5 moles of hydrogen per mole of hydrocarbon. Expressed in terms of partial pressure of hydrogen, the amount may be 0 to 625 pounds per square inch. Under these circumstances and using the novel catalyst of this invention, it is possible to convert a substantial amount of the normal alkanes to iso-alkanes and improve the F-1 clear octane numbers of light naphtha.

The process of the invention may be effected in any suitable equipment; especially suitable is the use of the fixed bed process in which the catalyst is deposited in a reaction zone or zones, the hydrocarbon passing through such zone or zones in contact with the catalyst. Another suitable apparatus is the fluid type in which the catalyst is suspended by the upwardly moving gaseous hydrocarbon stream. After reforming, the products may be fractionated to separate excess hydrogen and to recover the desired fractions of isomerized product.

The invention will be further illustrated in the following examples. It should be understood, however, that the examples are given for the purpose of illustration, as the invention in its broader aspects is not limited thereto.

EXAMPLE 1a

Preparation of base components: 800 grams of a synthetic silica-alumina cracking component, comprising about 88% by weight of silica and the balance alumina, were prepared by mixing the wet, purified, gels of alumina and silica. The mixture was dried at 250° F., reshaped into 3/16 inch pellets, and heated at about 1000° F. for 2 hours. The pellets then had a surface area of about 250 square meters per gram.

EXAMPLE 1b

Preparation of reduced area component: The catalyst pellets of Example 1a were steam treated for 75 hours at 1150° F. to form the base, or reduced area, component having a surface area of 167 square meters per gram.

EXAMPLE 2

Impregnation of reduced area base component with chromia: To a solution comprising 100 cc. of water and 6 grams of chromic trioxide was added 97 grams of the reduced surface area component of Example 1b. The mixture was dried at 150° F. for 24 hours and at 980° F. for an additional 24 hours. The product is a catalyst within the scope of this invention and contains 3.0% chromium based on the reduced surface area base component.

EXAMPLES 3-7

These examples are designed to determine the relative effect on isomer yield of chromium concentration in the catalyst, and employed the catalyst of Example 1a having an area of 250 m.$^2$/g. before reduction in surface area.

A feed comprising three moles of hydrogen per mole of normal pentane was passed over the catalyst, maintained in fixed bed type apparatus, at a rate of one liquid volume of pentane per volume of catalyst per hour. The catalyst bed was maintained at 900° F. and the partial pressure of hydrogen at 150 pounds per square inch. Results are set forth in Table I below:

*Table I*

| Example No. | Hydrogen lbs./in.$^2$ | Weight Percent Chromium on Base Component | Weight Percent Isopentane (on pentane feed) in product |
|---|---|---|---|
| 3 | 150 | 0.0 | 2.0 |
| 4 | 150 | 0.5 | 1.2 |
| 5 | 150 | 1.0 | 3.3 |
| 6 | 150 | 3.0 | 9.0 |
| 7 | 75 | 6.8 | 1.5 |

These examples indicate that the yield of isopentane is at a maximum when a concentration of chromium on the catalyst base is about 3%. It further shows that the yields are still appreciable in the 1 to about 6% chromium range.

EXAMPLES 8-12

These examples are designed to show the effect of hydrogen partial pressure in the feed and of catalyst temperature on the isomer yield. The catalyst of Example 6 was used in Examples 8-10, and the catalyst of Example 2 was used in Examples 11 and 12. The feed, feed rates, and apparatus were the same as used in Examples 3-7.

*Table II*

| Example No. | Hydrogen lbs./in.$^2$ | Catalyst Temp. ° F. | Weight Percent Isopentane (on feed) in Product |
|---|---|---|---|
| 8 | 150 | 800 | 2.1 |
| 9 | 300 | 800 | 3.1 |
| 6 | 150 | 900 | 9.0 |
| 10 | 300 | 900 | 9.4 |
| 11 | 500 | 900 | 11.4 |
| 12 | 500 | 1,000 | 15.5 |

A comparison of Examples 6 and 8 indicates that yields of isomers will be markedly increased by raising reaction temperatures at constant hydrogen pressures. Conversely, at constant temperatures and increasing hydrogen pressures, yields may also be increased as shown by Examples 9 and 10, although the magnitude of this latter increase is not quite as great as that possible by increasing temperatures.

Examples 11 and 12 show that high hydrogen pressures and catalyst temperatures promote high isomer yields. However, in going from 900 to 1000° F., the amount of feed loss to coke and gas (products having 4 or less carbon atoms per molecule) was from 4.6 to 42.6 by weight based on pentane feed. Hence, temperatures over 1000° F. are not as desirable.

EXAMPLES 13-17

Having determined the optimum amount of chromia in the previous examples, the effect of surface area on isomer yield and on losses through cracking was then determined under conditions of Examples 3-7. The chromium content was held constant at the optimum of 3.0% and hydrogen pressure was held constant at 500 p.s.i. Results are shown in Table III.

Table III

| Example No. | Base Component Surface Area square meters/gram | Wt. Percent Isoparaffin (Based on Paraffin Feed) | Wt. Percent $C_4$ and Lighter |
|---|---|---|---|
| 13 | 11.7 | 3.2 | 30.8 |
| 14 | 31.6 | 3.5 | 30.0 |
| 15 | 122 | 8.5 | 18.0 |
| 16 | 167 | 11.4 | 4.6 |
| 17 | 250 | 9.0 | 21.0 |

The results of Examples 13–17 in which the feed was normal pentane surprisingly show maximum isomer yield and minimum loss through cracking to $C_4$ and lighter when the surface area ranges from about 110 to 235 square meters/gram.

EXAMPLES 18–20

These examples were conducted under the same conditions as used in Examples 13–17, except that the feed was normal heptane. Results, shown in Table IV, again show that isomerization yield is at a maximum in the surface area range of 110 to 235 m.²/g.

Table IV

| Example No. | Base Component Surface Area square meters/gram | Wt. Percent Isoparaffin (Based on Paraffin Feed) | Wt. Percent $C_6$ and Lighter |
|---|---|---|---|
| 18 | 11.7 | 11.1 | 26.4 |
| 19 | 167 | 20.0 | 44.4 |
| 20 | 250 | 9.2 | 47.0 |

In the examples where normal heptane was the feed, the cracking did not show an optimum as it did with pentane. This might be expected because of the greater susceptibility of higher hydrocarbons to cracking. There was, however, an optimum isomerization at the optimum surface area.

The preferred catalyst of the invention (Example 2) was employed to isomerize a light naphtha having the following specifications:

| | |
|---|---|
| Kattwinkel No. | 8.0 |
| Bromine No. | 1.13 |
| Octane No. | 65.7 |
| Engler distillation: | |
| I.B.P., °F. | 126 |
| Percent over— | |
| 5 | 152 |
| 10 | 158 |
| 20 | 165 |
| 30 | 172 |
| 40 | 179 |
| 50 | 186 |
| 60 | 193 |
| 70 | 200 |
| 80 | 209 |
| 90 | 222 |
| 95 | 243 |
| E.P. | 249 |

The conditions of the isomerization and the results are shown in the following table:

Table V

| | Example 21 | Example 22 | Feed |
|---|---|---|---|
| Feed Rate | 1 v.v.h. | 1 v.v.h. | |
| Temperature °F. | 1000 | 1000 | |
| $H_2$ Partial Pressure p.s.i. | 240 | 0 | |
| Octane Number | 79.6 | 70.7 | 65.7 |
| Yield (Vol. Percent) | 56.5 | 93.5 | |
| Kattwinkel No. | 30 | 20 | 8.0 |
| Bromine No. | 8.24 | 9.28 | 1.13 |

While there was a small amount of olefin formation as shown by the increase in bromine number, and some aromatization as shown by the Kattwinkel number considered in relation to the bromine number, the marked increase in octane number is attributed to the isomerization of alkanes. These data also show the effect of hydrogen partial pressure on yield and octane number.

It is intended to cover all changes and modifications in the examples of the invention, herein given for purposes of illustration, which do not constitute departure from the spirit and scope of the appended claims.

We claim:

1. A process of isomerizing a $C_5$–$C_7$ normal alkane, which comprises contacting the same with a catalyst comprising a base having a silica-alumina ratio of about 95:5 to 50:50 percent by weight impregnated with chromia to provide 1 to 6% chromium by weight, obtained by (1) heating a high surface area silica-alumina base of the above-defined silica-alumina ratio to reduce the surface area to from 110 to 235 square meters per gram and (2) impregnating the reduced surface area base with chromia in the amount above recited; said contacting taking place at a temperature of 700 to 1050° F., in the presence of hydrogen in an amount of from 0 to 5 mols of hydrogen per mol of hydrocarbon, and at a pressure of from 0 to 750 pounds per square inch gauge, to convert a substantial amount of said normal alkane to iso-alkane.

2. A process of isomerizing a $C_5$–$C_7$ normal alkane, which comprises contacting the same with a catalyst comprising a base having a silica-alumina ratio of about 88:12 percent by weight impregnated with chromia to provide about 3% chromium by weight, obtained by (1) heating a high surface area silica-alumina base of the above-defined silica-alumina ratio to reduce the surface area to about 167 square meters per gram and (2) impregnating the reduced surface area base with chromia in the amount above recited; said contacting taking place at a temperature of about 900° F., in the presence of hydrogen to provide a partial pressure of 150 pounds per square inch, to convert a substantial amount of said normal alkane to iso-alkane.

References Cited in the file of this patent

UNITED STATES PATENTS

| | | |
|---|---|---|
| 2,317,803 | Reeves et al. | Apr. 27, 1943 |
| 2,550,531 | Ciapetta | Apr. 24, 1951 |
| 2,718,535 | McKinley et al. | Sept. 20, 1955 |
| 2,735,801 | Gutzeit | Feb. 21, 1956 |

FOREIGN PATENTS

| | | |
|---|---|---|
| 487,392 | Canada | Oct. 21, 1952 |